Feb. 10, 1942.  W. E. MENERAY ET AL  2,272,677
CONVEYER FOR FRUIT AND VEGETABLES
Filed March 22, 1940  2 Sheets-Sheet 1

Inventors,
Wallace E. Meneray and John G. Tew,
By Frank S. Appleman,
Attorney.

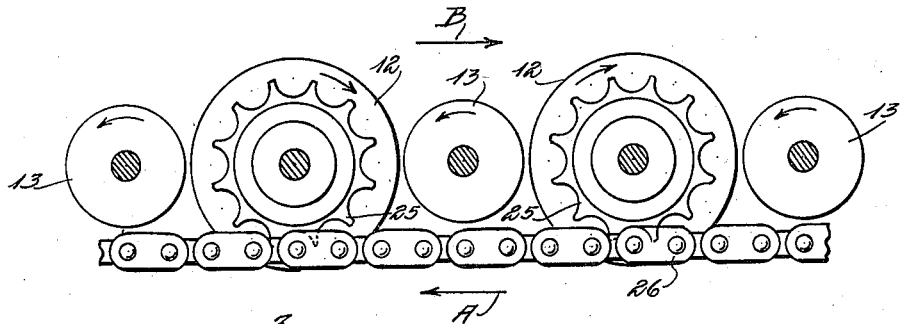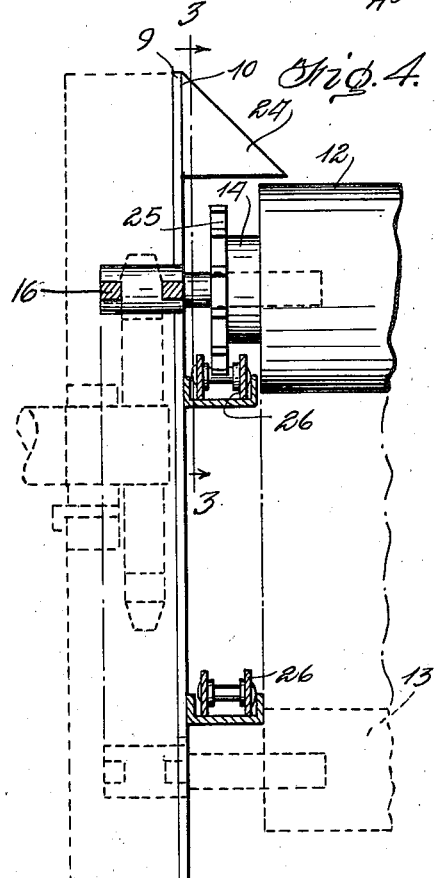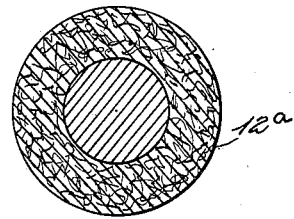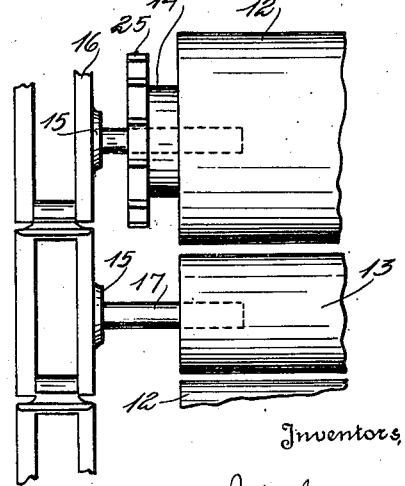

Patented Feb. 10, 1942

2,272,677

UNITED STATES PATENT OFFICE 2,272,677

CONVEYER FOR FRUIT AND VEGETABLES

Wallace E. Meneray and John G. Tew,
Lakeland, Fla.

Application March 22, 1940, Serial No. 325,430

2 Claims. (Cl. 198—183)

This invention relates to conveying and handling machines, washers and polishers for vegetation such as fruit and vegetables.

It is an object of this invention to provide a conveying and handling device for vegetable washing and polishing machines in which bristles or like abrading instrumentalities are omitted, as such bristles at times unduly abrade the vegetation and disrupt the skin or rind thereof.

It is a further object of this invention to provide a machine of the character indicated in which rollers are employed, some of which are covered with a substance similar to or having the characteristics of cellulose sponge, with other rollers associated therewith having plain surfaces, such as wood, the arrangement being such that the covered and plain rollers are alternately disposed, the covered rollers being rotated so as to rotate the vegetables while the latter rests on the plain rollers, which thus enable easy rotation of the vegetables.

It is a still further object of the invention to produce a conveying and turning device of the character indicated which conveys the vegetation from one end of a frame to the other and during its transfer or movement along the frame causes the vegetables to constantly rotate whereby to facilitate the washing or drying operation, it being understood that novel means are provided for driving or operating the rollers on which the vegetation is cleaned and conveyed.

It is furthermore an object of this invention to provide a conveyer of the character indicated in which rollers are covered or provided with jackets of a material similar to synthetic cellulose sponge which is more absorbent and will carry more of the cleaning solution during a washing operation than rollers having bristles or rollers made of tampico or palmetto such as are now in common use.

The advantages for the invention are that the cellulose sponge is more absorbent and during the drying operation will, by capillary attraction, draw in the fluid and operate more effectively as a drying agency than will sponge rubber. Furthermore, cellulose jackets are more durable than rollers having bristles and a roller having the characteristics of that described enables vegetables having tender skins to be conveyed and rotated without abrasion or marring of the skins.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 3 illustrates an enlarged detail section on the line 3—3 of Fig. 4 showing the ends of the rollers, and the means for rotating the jacketed rollers;

Figure 4 illustrates an enlarged detail section showing the conveyer operating means and the means for rotating the jacketed rollers;

Figure 5 illustrates a sectional view of a jacketed roller with its sprocket wheel omitted; and Figure 6 illustrates a plan view of the rollers and a fragment of the conveyer.

Figure 1:
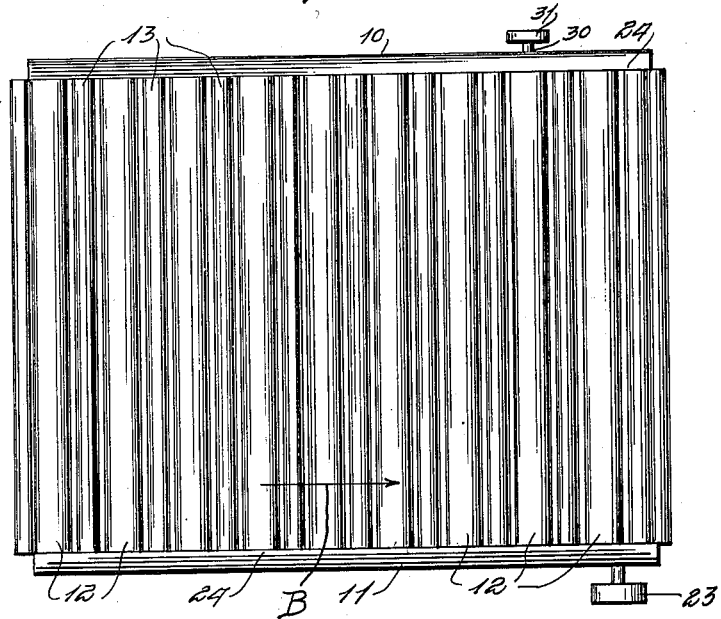
Figure 1 illustrates a plan view of a conveyer having the rollers heretofore referred to and driving means applied thereto.

In these drawings, a frame has standards 9 on each side near the ends and side rails 10 and 11 are secured on the said standards and between which side rails the turning rollers 12 and the supporting rollers 13 travel. The rollers 12 have each a jacket or covering 12a of cellulose sponge which is durable and aids in the distribution of the cleaning fluid and also the absorption of the cleaning fluid after the vegetation has been washed and is to be dried. The turning rollers 12 are rotated independently of the supporting rollers and they have trunnions such as 14 carried by the links of the conveyer chain 16, which trunnions enter the ends of the rollers and the rollers rotate on said trunnions. The supporting rollers 13 are likewise provided with apertures in their ends, into which trunnions or pins 17 projecting from bosses 15 on the chain 16 carried by the sprocket chains project and on which trunnions the supporting rollers are rotatably mounted. At the ends of the frame and on each side thereof, sprocket wheels 18 and 19 are rotatably mounted in bearings 20 and 21, respectively, so that the links of the conveyer chain, one of which is on each side of the frame, are engaged by the teeth of the sprocket wheel. The shaft 22 on which the sprocket wheels 19 are carried is positively driven by any suitable power applying instrumentality applied to the pulley or like element 23, and the said member 23 is rotated so as to drive the conveyer belt or chain in the direction of the arrow B shown in Figs. 2 and 3 and hence, the turning rollers mounted on the conveyer as heretofore described are moved between the rails or side members 10 and 11 of the frame, and these rails or side members have facings 24, preferably of the same cellulose sponge heretofore referred to, to prevent bruising or abrasion of the vegetation as it is conveyed from one end of the frame to the other.

Figure 2:
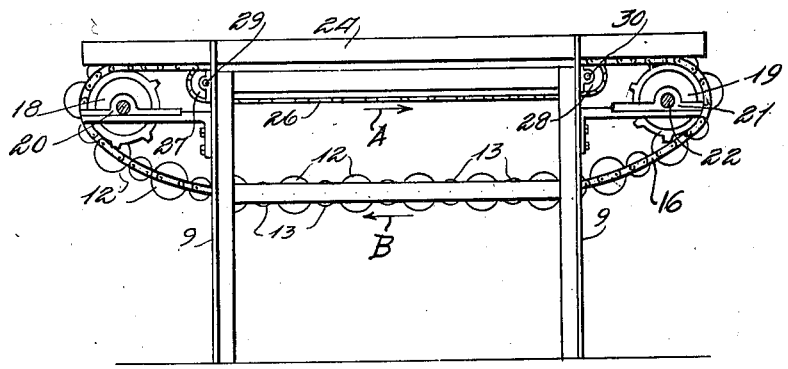
Figure 2 illustrates a view in elevation of the frame and mechanism.

Each of the jacketed rollers 12 is associated with a sprocket wheel 25 fixed thereon and these sprocket wheels are engaged by a sprocket chain 26 which is driven in the direction of the arrows A of Figs. 2 and 3 thus rotating the jacketed rollers in the direction of the arrows applied to the ends of said rollers in Fig. 3. The sprocket chain 26 coacts with sprocket wheels 27 and 28, one of which is on each side of the frame at the ends or near the ends of the frame, and the said sprocket wheels 27 and 28 may be mounted on shafts 29 and 30, respectively, in suitable bearings on the frame. The shaft 30 is extended at one side of the frame and has a power transmitting medium 31, such as a pulley or the like, which is power driven in any suitable way in the direction of the arrow A shown in proximity to said member 26. As the sprocket or driving chain 26 is driven in the direction of the arrow A, Fig. 3, and the conveyer carrying the rollers 12 and 13 is moved in the direction of the arrow B, Fig. 3, the rollers 12 will be turned in the direction of the arrows applied to the ends of said rollers and thus the vegetation will be conveyed longitudinally of the frame while at the same time it is being turned over and over by the action of the rollers 12 so that it may be washed or dried according to the process desired. The jacketed rollers are rotated in a clockwise direction as will appear while being moved by the conveyer chains from one end of the frame to the other. The material rests on the rollers 13 during this conveying and turning operation so that these rollers 13 may turn readily by the friction of the turning movement of the material. Thus, the material is supported so that it requires but little effort (friction of the rollers 12) to effect turning thereof.

It is possible by suitable control of the R. P. M. of the shafts to regulate the degree of operation or rapidity of rotation of the several rollers carried by the conveyer in order that the most efficient and effective mode of operation may be reached.

When this conveyer is used for washing, an overhead frame, such as is shown in the patent to G. T. Stamm, No. 1,205,117 may be used in connection with this conveyer. When this conveyer is used for drying, it may be run sufficiently slow to accomplish natural air drying or may be used in connection with heating and ventilating means. Since, however, the invention resides in the conveyer, it is not deemed necessary to show herein any additional apparatus either for washing or drying.

We claim:

1. A conveyer for use with a washer and drier for fruit and vegetables comprising a frame, side rails on the frame having cushioned surfaces, conveyer chains mounted for movement longitudinally of the frame, one of which is on each side of the frame, jacketed rollers rotatably mounted on the conveyer chains, the upper run of the said conveyer chains being approximately parallel with the lower edges of the side rails, freely rotatable rollers on the said conveyer chains, one of which is interposed between each two jacketed rollers, sprockets on the jacketed rollers, a sprocket chain engaging said sprockets, and means for independently driving the chain.

2. A conveyer for use with a washer and drier for fruit and vegetables comprising a frame, side rails on the frame having cushioned surfaces, conveyer chains mounted for movement longitudinally of the frame, one of which is on each side of the frame, trunnions on the said conveyer chains extending inwardly therefrom, jacketed rollers rotatably mounted on the said trunnions, the upper run of said conveyer chains being approximately parallel with the lower edge of the side rails, freely rotatable rollers mounted on other trunnions carried by the chains, one of said rollers being between each two of the jacketed rollers, sprockets on the jacketed rollers, a sprocket chain engaging said sprockets, and means for independently driving the chain.

WALLACE E. MENERAY.
JOHN G. TEW.